(12) United States Patent
Au et al.

(10) Patent No.: US 8,923,390 B2
(45) Date of Patent: Dec. 30, 2014

(54) SCALAR QUANTIZATION USING BIT-STEALING FOR VIDEO PROCESSING

(75) Inventors: Oscar Chi Lim Au, Hong Kong (CN); Ngai Man Cheung, Hong Kong (CN); Xingyu Zhang, Shenzhen (CN)

(73) Assignee: The Hong Kong University of Science and Technology, Kowloon (HK)

( * ) Notice: Subject to any disclaimer, the term of this patent is extended or adjusted under 35 U.S.C. 154(b) by 691 days.

(21) Appl. No.: 12/818,797

(22) Filed: Jun. 18, 2010

(65) Prior Publication Data

US 2010/0322306 A1 Dec. 23, 2010

Related U.S. Application Data

(60) Provisional application No. 61/213,559, filed on Jun. 19, 2009.

(51) Int. Cl.
| | |
|---|---|
| *H04N 7/26* | (2006.01) |
| *H04N 19/14* | (2014.01) |
| *H04N 19/126* | (2014.01) |
| *H04N 19/176* | (2014.01) |
| *H04N 19/60* | (2014.01) |
| *H04N 7/50* | (2006.01) |

(52) U.S. Cl.
CPC ... *H04N 19/00157* (2013.01); *H04N 19/00096* (2013.01); *H04N 19/00278* (2013.01); *H04N 19/00775* (2013.01)
USPC .................................. 375/240.03; 375/240.12

(58) Field of Classification Search
None
See application file for complete search history.

(56) References Cited

U.S. PATENT DOCUMENTS

| | | | |
|---|---|---|---|
| 4,366,439 A | 12/1982 | Yamakido | |
| 4,549,304 A | 10/1985 | Weirich et al. | |
| 4,903,301 A | 2/1990 | Kondo et al. | |
| 5,150,209 A | 9/1992 | Baker et al. | |
| 5,412,415 A | 5/1995 | Cook et al. | |
| 5,724,097 A * | 3/1998 | Hibi et al. ................ | 375/240.04 |
| 5,740,278 A | 4/1998 | Berger et al. | |
| 5,995,923 A | 11/1999 | Mermelstein et al. | |
| 6,006,189 A | 12/1999 | Strawczynski et al. | |

(Continued)

FOREIGN PATENT DOCUMENTS

CN 1209894 A 3/1999

OTHER PUBLICATIONS

Gary J. Sullivan, "Efficient Scalar Quantization of Exponential and Laplacian Random Variables", IEEE Transactions on Information Theory, Vol. 42, No. 5, Sep. 1996.

(Continued)

*Primary Examiner* — Behrooz Senfi
*Assistant Examiner* — Mohammed Jebari
(74) *Attorney, Agent, or Firm* — Amin, Turocy & Watson, LLP

(57) ABSTRACT

Systems, methods, and apparatus for adaptively zeroing out transform coefficients utilizing a bit-stealing parameter are presented herein. A partitioning component can be configured to separate an image into blocks of video data. Further, a frequency transform component can be configured to transform pixels of a block of the blocks into transform coefficients. Furthermore, a bit-stealing quantization component configured to predefine quantization intervals. Moreover, the bit-stealing quantization component can modify a size of a quantization interval of the quantization intervals based on a variable bit-stealing parameter. Further, the bit-stealing component can quantize a transform coefficient of the transform coefficients, based on the quantization interval, to a quantized coefficient value of quantized coefficient values.

20 Claims, 17 Drawing Sheets

(56) References Cited

U.S. PATENT DOCUMENTS

| | | | |
|---|---|---|---|
| 6,363,339 | B1 | 3/2002 | Rabipour et al. |
| 6,377,709 | B1 | 4/2002 | Guillotel |
| 6,389,074 | B1 | 5/2002 | Andrew |
| 6,408,026 | B1 * | 6/2002 | Tao .................... 375/240.03 |
| 7,027,982 | B2 | 4/2006 | Chen et al. |
| 7,106,366 | B2 | 9/2006 | Parker et al. |
| 7,308,146 | B2 | 12/2007 | Becker et al. |
| 7,536,059 | B2 | 5/2009 | Xu et al. |
| 2007/0160138 | A1 * | 7/2007 | Wedi et al. .............. 375/240.03 |
| 2007/0160300 | A1 * | 7/2007 | Van Vugt et al. ............ 382/240 |
| 2008/0080615 | A1 * | 4/2008 | Tourapis et al. ......... 375/240.03 |
| 2008/0240235 | A1 | 10/2008 | Holcomb et al. |

OTHER PUBLICATIONS

Guobin Shen, "High efficiency image/video coding techniques", Thesis (Ph. D.)—Hong Kong University of Science and Technology, 2000.

Jiang et al, "A Rate-distortion Based Quantization Level Adjustment Algorithm in Block-based Video Compression", 1-4244-1017-7/07, Multimedia and Expo, 2007 IEEE International Conference, Jul. 2-5, 2007.

Wedi et al, "Rate-distortion constrained estimation of quantization offsets," JVT Document, JVT-0066rl, Busan, KR, Apr. 2005.

Gary J. Sullivan, "On Embedded Scalar Quantization", 0-7803-8484-9/04, IEEE, 2004.

Joel Max, "Quantizing for Minimum Distortion", IRE Transactions on Information Theory, Mar. 1959.

Ramchandran et al., "Rate-Distortion Optimal Fast Thresholding with Complete JPEG/MPEG Decoder Compatibility", IEEE Transactions on Image Processing, vol. 3, No. 5, Sep. 1994.

Gary Sullivan, "Adaptive quantization encoding technique using an equal expected-value rule", JVT-N011, JVT of ISO/IEC MPEG & ITU-T VCEG, Hong Kong, China, Jan. 2005.

Shen et al., "Syntax-Constrained Rate-Distortion Optimization for DCT-based Image Encoding Methods", Visual Communications and Image Processing 2000, Proceedings of SPIE vol. 4067, 2000.

* cited by examiner

SCALAR QUANTIZATION USING BIT-STEALING FOR VIDEO PROCESSING

PRIORITY CLAIM

This application claims priority to U.S. Provisional Patent Application Ser. No. 61/213,559, filed on Jun. 19, 2009, entitled "SCALAR QUANTIZATION USING BIT-STEALING AND ITS APPLICATION TO VIDEO CODING." The entirety of the aforementioned application is incorporated by reference herein.

TECHNICAL FIELD

This disclosure relates generally to image processing including, but not limited to, scalar quantization using bit-stealing for video processing.

BACKGROUND

The need for efficient data compression, or more generally encoding, techniques is ever-increasing. For example, video coding is a central technology in a variety of applications, including consumer electronics, e.g., digital video disk (DVD) players/recorders, digital still cameras, mobile phones, etc., the Internet, e.g., streaming video applications, distance learning, surveillance and/or security applications, etc. In addition, audio compression has been used in a wide range of applications, such as music playback in Moving Picture Experts Group (MPEG) standards based applications, e.g., MPEG-1 Audio Layer 3 (MP3) players, computers, digital television, satellite radio, cable radio, etc.

Central to lossy data video compression is quantization. Quantization is the process of approximating a continuous range of input values, or a very large set of discrete input values, by a set of integer valued quantization indices. A video frame is segmented into "macroblocks" that are sequentially encoded. Each macroblock (MB) of the macroblocks can be encoded in one of two coding modes: intra-mode and inter-mode. In intra-mode, original MB data, e.g., pixels of blocks of the MB, are transform-coded without prediction. On the other hand, in inter-mode decoding, a MB is predicted from a previously decoded frame via motion compensation. Quantization can be applied to transform coefficients of the intra/inter-mode prediction error, or residue. In many scenarios, video coding systems employ scalar quantization, which operates on scalar input data, e.g., each input data is treated separately in producing an output, e.g., a finite set of values approximating the continuous range of input values.

A scalar quantizer for an input X, e.g., video data, includes two functions: (1) Classification function $I=C[X]$, which selects an integer-valued class identifier I, or quantization index, at an encoder, based on the input X, and (2) Reconstruction function $Y=R[I]$, which produces a reconstruction value of X (denoted by Y) at a decoder, based on the quantization index I. Conventional encoding techniques utilize a dead-zone (or deadzone) plus uniform threshold classification quantizer/uniform-reconstructor quantizer (DZ+UTQ/URQ) to approximate a range of input values. Although such techniques adjust a deadzone size associated with the DZ+UTQ, e.g., via a deadzone parameter (z) and/or rounding offset (f) to improve coding scalar quantizer coding efficiency, such techniques incur increased rate-distortion.

The above-described deficiencies of today's image processing techniques and related encoding technologies are merely intended to provide an overview of some of the problems of conventional technology, and are not intended to be exhaustive. Other problems with the state of the art, and corresponding benefits of some of the various non-limiting embodiments described herein, may become further apparent upon review of the following detailed description.

SUMMARY

The following presents a simplified summary to provide a basic understanding of some aspects described herein. This summary is not an extensive overview of the disclosed subject matter. It is not intended to identify key or critical elements of the disclosed subject matter, or delineate the scope of the subject disclosure. Its sole purpose is to present some concepts of the disclosed subject matter in a simplified form as a prelude to the more detailed description presented later.

To correct for the above identified deficiencies of today's image processing techniques and other drawbacks of conventional video processing technologies, various systems, methods, and apparatus described herein adaptively zero out transform coefficients utilizing a bit-stealing parameter. For example, a method for encoding video data can include dividing an image into blocks of video data; transforming pixels of a block of the blocks into transform coefficients; adjusting sizes of predefined quantization intervals based on a variable bit-stealing parameter; and quantizing the transform coefficients, based on the predefined quantization intervals, by mapping a coefficient value of a transform coefficient of the transform coefficients to a quantized coefficient value—encoded video data including the quantized coefficient value.

In another example, an encoder can include a partitioning component configured to separate an image into blocks of video data. Further, the encoder can include a frequency transform component configured to transform pixels of a block of the blocks into transform coefficients. Furthermore, the encoder can include a bit-stealing quantization component configured to predefine quantization intervals; modify a size of a quantization interval of the quantization intervals based on a variable bit-stealing parameter; and quantize a transform coefficient of the transform coefficients, based on the quantization interval, to a quantized coefficient value of quantized coefficient values.

In yet another example, a system can include means for transforming pixels of a block of video data into transform coefficients; means for adjusting sizes of predefined quantization intervals based on a variable bit-stealing parameter; and means for quantizing the transform coefficients, based on the predefined quantization intervals, into quantized coefficient values The following description and the annexed drawings set forth in detail certain illustrative aspects of the disclosed subject matter. These aspects are indicative, however, of but a few of the various ways in which the principles of the innovation may be employed. The disclosed subject matter is intended to include all such aspects and their equivalents. Other advantages and distinctive features of the disclosed subject matter will become apparent from the following detailed description of the innovation when considered in conjunction with the drawings.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
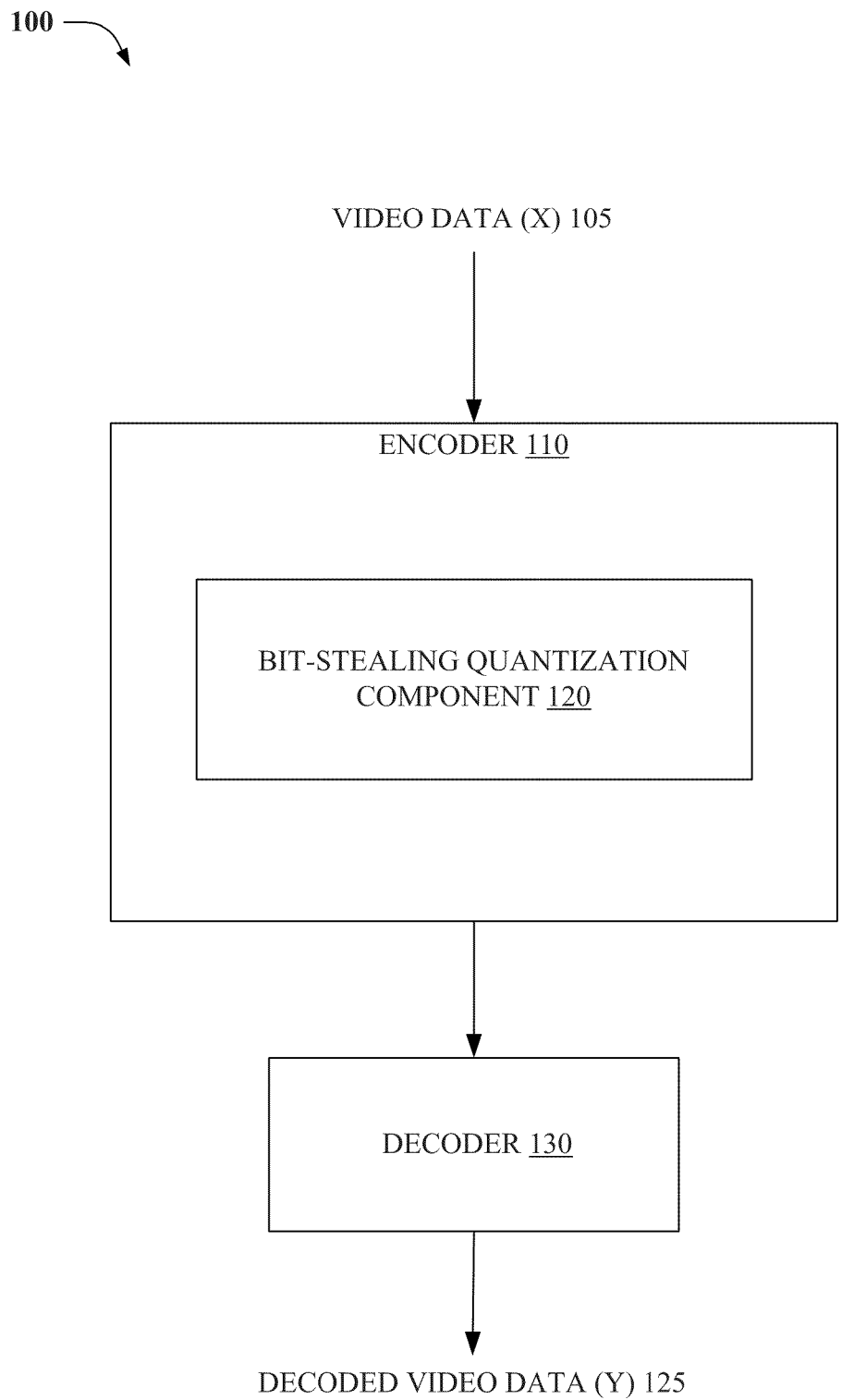
FIG. 1 illustrates a block diagram of an image processing system, in accordance with an embodiment.

Various non-limiting embodiments of systems, methods, and apparatus presented herein adaptively zero out transform coefficients utilizing a bit-stealing parameter.

In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used, via partitioning component 510 (see below), to automatically separate an image into blocks of video data. Further, the artificial intelligence system can be used, via frequency transform component 520 (see below) to automatically transform pixels of a block of the blocks into transform coefficients. Furthermore, the artificial intelligence system can be used, via bit-stealing quantization component 120 (see below), to automatically: predefine quantization intervals; modify a size of a quantization interval of the quantization intervals based on a variable bit-stealing parameter; and quantize a transform coefficient of the transform coefficients, based on the quantization interval, to a quantized coefficient value of quantized coefficient values.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

Referring now to FIG. 1, a block diagram of an image processing system 100 is illustrated, in accordance with an embodiment. Aspects of image processing system 100, and systems, other apparatus, and processes explained herein can constitute machine-executable instructions embodied within machine(s), e.g., embodied in one or more computer readable mediums (or media) associated with one or more machines. Such instructions, when executed by the one or more machines, e.g., computer(s), computing device(s), virtual machine(s), etc. can cause the machine(s) to perform the operations described.

Additionally, the systems and processes explained herein can be embodied within hardware, such as an application specific integrated circuit (ASIC) or the like. Further, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Image processing system 100 includes encoder 110 including bit-stealing quantization component 120. Encoder 110 can receive and/or obtain video data (X) 105, which can include blocks of pixels. Further, encoder 110 can couple to decoder 130, which can reconstruct X into reconstruction data (Y) 125.

As described above, although conventional image processing techniques can adjust a deadzone size and/or offset (associated with a DZ+UTQ), to improve coding scalar quantizer coding efficiency, such techniques incur increased rate-distortion.

Figure 2:
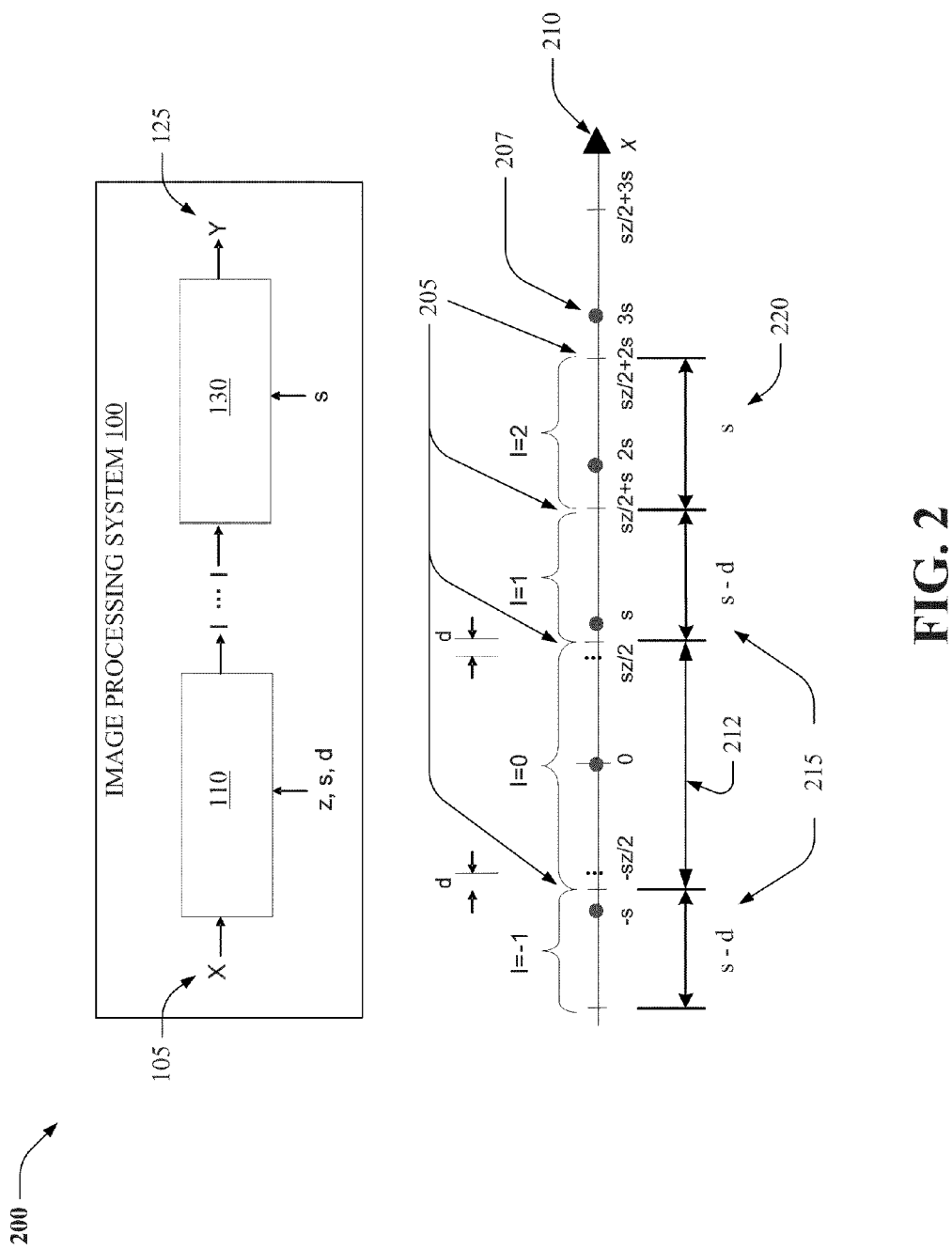
FIG. 2 illustrates classification thresholds of an image processing system, in accordance with an embodiment.

On the other hand, encoder 110 included in an image processing system, e.g., image processing system 100, can improve rate distortion performance associated with scalar quantization by adaptively zeroing out transform coefficients utilizing a bit-stealing parameter (d). For example, and referring now to FIG. 2, classification thresholds 205 of a quantizer 210, modified via bit-stealing quantization component 120, are illustrated, in accordance with an embodiment. As illustrated, s is an interval size, or width, of classification regions (or intervals) of quantizer 210 not equal to I=−1, 0, and 1; z is a deadzone parameter (see above); and 207 is a reconstruction value (Y) (see above). As such, size 212 of the deadzone (located at interval I=0 of quantizer 210) is adjusted, via bit-stealing quantization component 120, to s+2d; classification thresholds 205 of the deadzone are set by bit-stealing quantization component 120 to −zs/2−d and zs/2+d.

By increasing size 212 of the deadzone by d (at classification thresholds 205 of the deadzone), bit-stealing quantization component 120 reduces the interval width 215 of classification regions with quantization indices I=1 and I=−1 to s−d; in contrast, all non-dead-zone classification regions have an interval size s in conventional DZ+UTQ/URQ quantization techniques. Accordingly, unlike conventional image processing techniques, bit-stealing quantization component 120 "steals" bits during quantization, e.g., from the classification regions with quantization indices I=1 and 1, and effectively reduces a rate of quantization outputs (Y) 125 obtained via reconstruction, e.g., via decoder 130. As such, (and as described below), bit-stealing quantization component 120 reduces rate-distortion, compared to conventional quantizer technology.

In one or more aspects, rate-distortion performance of encoder 110 can be derived as follows: it can be shown that, at an operating point with a dead-zone parameter z, a bit-stealing parameter d can lead to a change in distortion defined by Equation (1) as follows:

$$D(d) - D(0) = 2 \int_T^{T+d} x^2 p(x) dx - 2 \int_T^{T+d} (x - y_1)^2 p(x) dx, \quad (1)$$

where T=zs/2, D(d) is the distortion with bit-stealing parameter d, and D(0) is the distortion without bit-stealing, i.e., distortion of the conventional DZ+UTQ/URQ. Equation (1) can be evaluated to be Equation (2), defined as follows:

$$D(d) - D(0) = \qquad (2)$$
$$e^{-\lambda(T+d)}(-2s)(T+d) + 2sTe^{-\lambda T} + e^{-\lambda T}\left(\frac{-2s}{\lambda} + s^2\right)(e^{-\lambda d} - 1).$$

Likewise, it can be shown that, at the operating point with dead-zone parameter z, a bit-stealing parameter d can lead to a change in rate defined by Equation (3) as follows:

$$H(d) - H(0) = -A(T+d)\log A(T+d) + A(T)\log A(T) - \qquad (3)$$
$$e^{-\lambda(T+d)}A(s-d)[-\log 2 - \lambda T - \lambda d + \log A(s-d)] +$$
$$e^{-\lambda T}A(s)[-\log 2 - \lambda T + \log A(s)],$$

where $$A(x) = 1 - e^{-\lambda x} \qquad (4)$$

Figure 3:
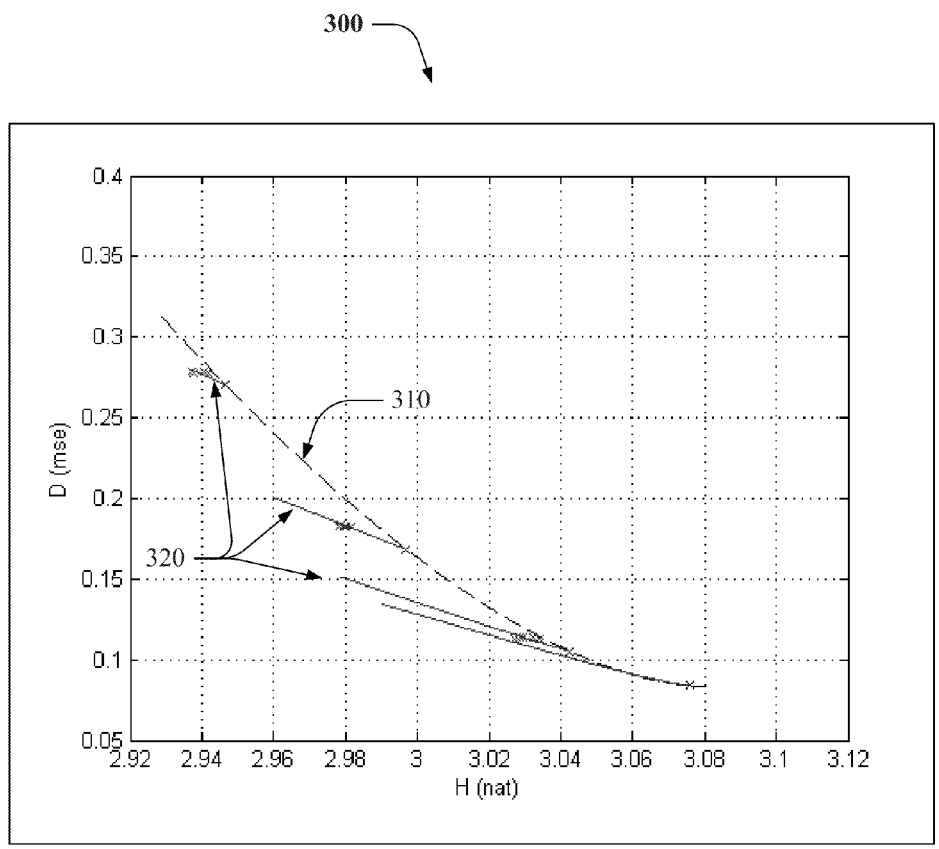
FIGS. 3-4 illustrate rate-distortion curves, in accordance with an embodiment.
Figure 4:
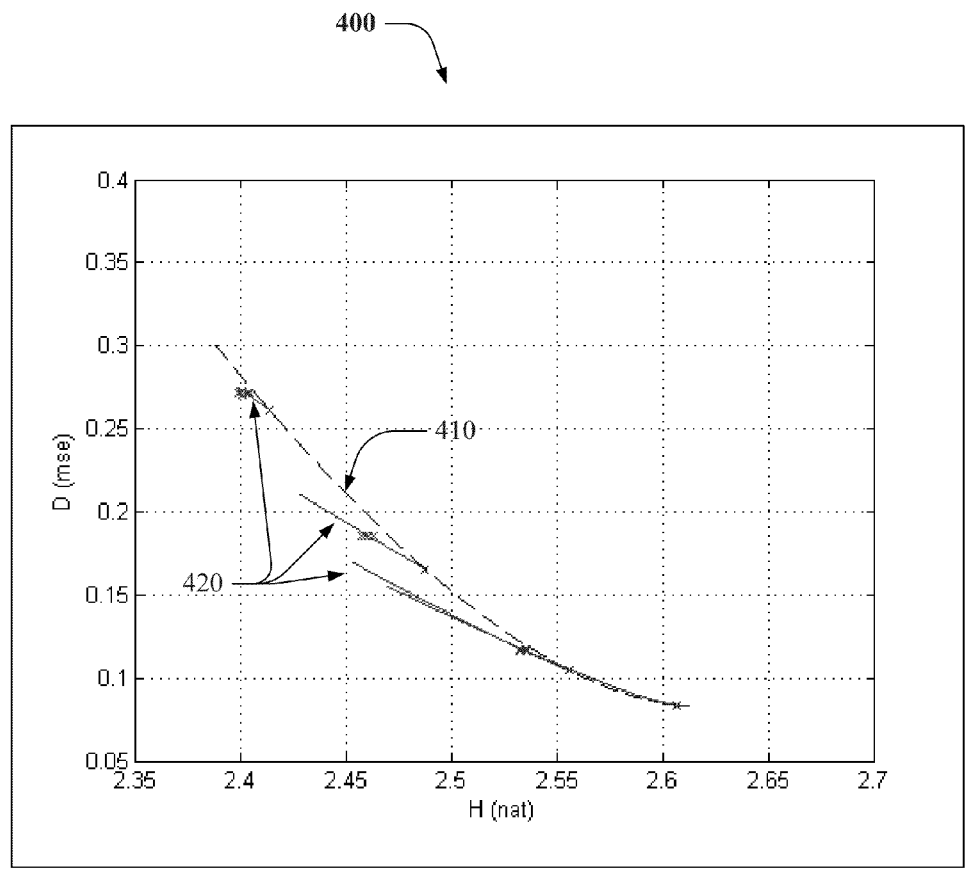

As illustrated by FIGS. 3 and 4, rate-distortion curves associated with conventional DZ+UTQ/URQ quantization techniques (see dashed lines 310 and 410) based on different settings of dead-zone parameter z are associated with higher distortion for a given bit-rate (or rate-distortion) (see vertical axes representing D in mean square error; horizontal axes represent rate H), than achieved by bit-stealing component 120 (see solid lines 320 and 420), e.g., associated with bit-stealing parameter d ranging from 0 to s−sz/2.

Figure 5:
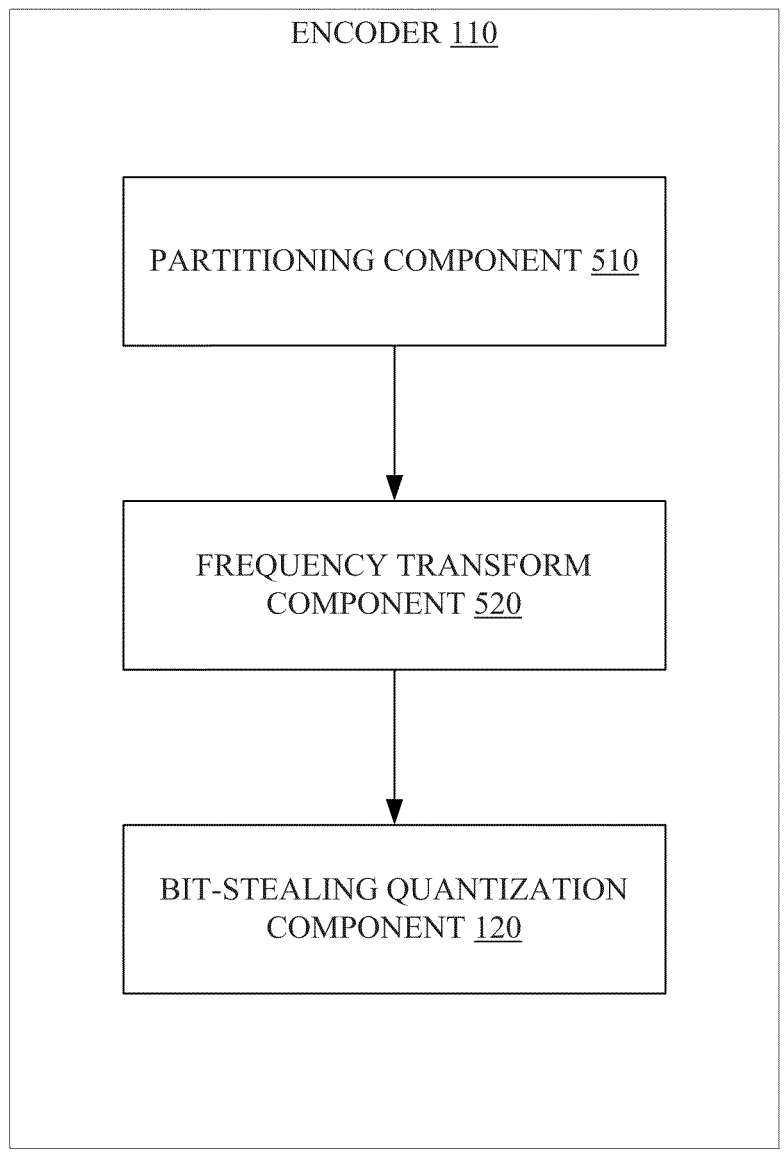
FIG. 5 illustrates a block diagram of an encoder, in accordance with an embodiment.

Now referring to FIG. 5, a block diagram of encoder 110 is illustrated, in accordance with an embodiment. Encoder 110 can include, in addition to bit-stealing quantization component 120, a partitioning component 510 and a frequency transform component 520. Partitioning component 510 can be configured to separate an image into blocks of video data. In an aspect, the image, e.g., video signal, video data 105, etc. can be a time domain signal that is composed of one or more two-dimensional frames, each of which can be composed of a series of blocks. In another aspect, blocks of the video signal can represent 8×8 pixel areas (or macroblocks) of the video signal, and/or other suitable sizes and/or arrangements of pixels. In yet another example, the blocks in the video signal can include intra-coded blocks ("I-blocks"), which are generated based only on information located at a frame in which the block is located; inter-coded blocks ("prediction blocks" or "P-blocks"), which can be generated based on information in a current frame as well as immediately preceding and/or succeeding frames; and/or other types of blocks.

Frequency transform component 520 can be configured to transform pixels of a block of the blocks into transform coefficients, e.g., Discrete Cosine Transform (DCT) coefficients including a DC coefficient, which represents an average value for the pixels of the block, and a set of AC coefficients representing changes in pixels of the block at respective increasing frequencies. Further, bit-stealing quantization component 120 can be configured to predefine quantization intervals, e.g., associated with quantizer 210 (see above).

Furthermore, bit-stealing quantization component 120 can be configured to modify a size of a quantization interval of the quantization intervals based on a variable bit-stealing parameter, e.g., d. Moreover, bit-stealing quantization component 120 can be configured to quantize a transform coefficient of the transform coefficients, based on the quantization interval, to a quantized coefficient value. For example, bit-stealing quantization component 120 can quantize the transform coefficients in accordance with predefined quantization intervals by mapping each coefficient value to a quantized coefficient value—wherein the sizes of the quantization intervals are adjusted according to the variable bit-stealing parameter.

In an aspect, bit-stealing quantization component 120 can be configured to modify the size of the quantization interval based on a rounding offset that is not part of video data encoded via bit-stealing quantization component 120. In another aspect, bit-stealing quantization component 120 can further be configured to modify the size of the quantization interval based on a value of the variable bit-stealing parameter, wherein the value is equal to or greater than zero, and wherein the value is less than or equal to a step size of the quantization intervals minus a half of a step size of a quantization interval of the quantization intervals associated with a dead-zone, e.g., the value is equal to or greater than zero, and less than or equal to s−sz/2.

In yet another aspect, bit-stealing quantization component 120 can be further configured to modify, or update, the variable bit-stealing parameter every field of a video sequence of the video data associated with the pixels of the block or every frame of the video sequence. In one aspect, bit stealing quantization component can further be configured to update the variable bit-stealing parameter once per video sequence of video sequences of the video data associated with the pixels of the block; and/or update the variable bit-stealing parameter every pre-defined sub-sequence of the video sequence.

In another aspect, bit-stealing quantization component 120 can be further configured to quantize the transform coefficient based on a type of a macroblock including at least one of an intra-coded (I) type (or I-block) of the macroblock, a predicted (P) type (or P-block) of the macroblock, or bi-directionally predicted (B) type of the macroblock. Further, bit-stealing quantization component 120 can modify the variable bit-stealing parameter based on the type.

Figure 6:
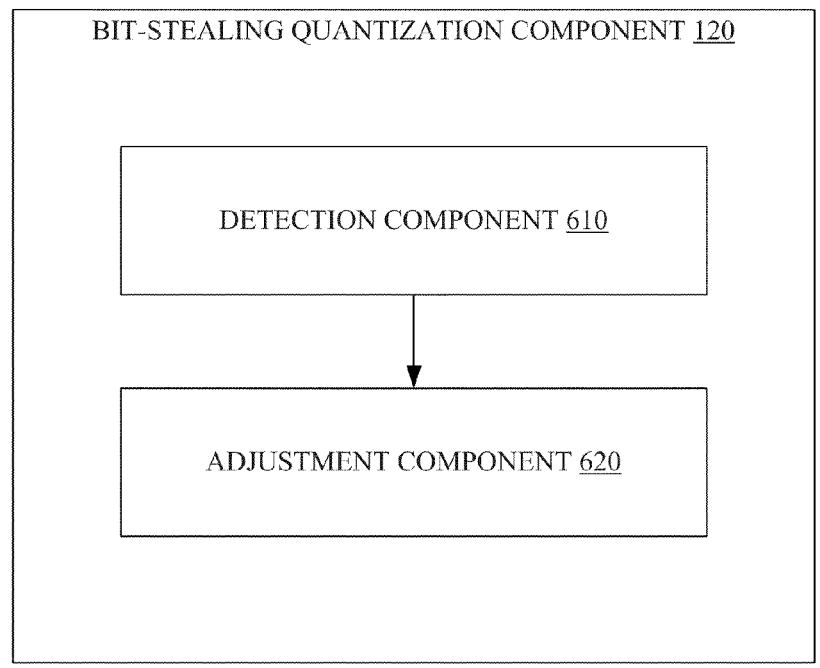
FIGS. 6-8 illustrate block diagrams of different bit-stealing quantization components, in accordance with an embodiment.

Now referring to FIG. 6, bit-stealing quantization component 120 including detection component 610 and adjustment component 620 is illustrated, in accordance with an embodiment. Detection component 610 can be configured to detect one or more variances of, or change(s) in, the transform coefficients based on at least one of a frequency, a region of the video data, or a sub-sequence of the video data. Further, adjustment component 620 can be configured to modify the variable bit-stealing parameter based on the one or more variances.

Figure 7:
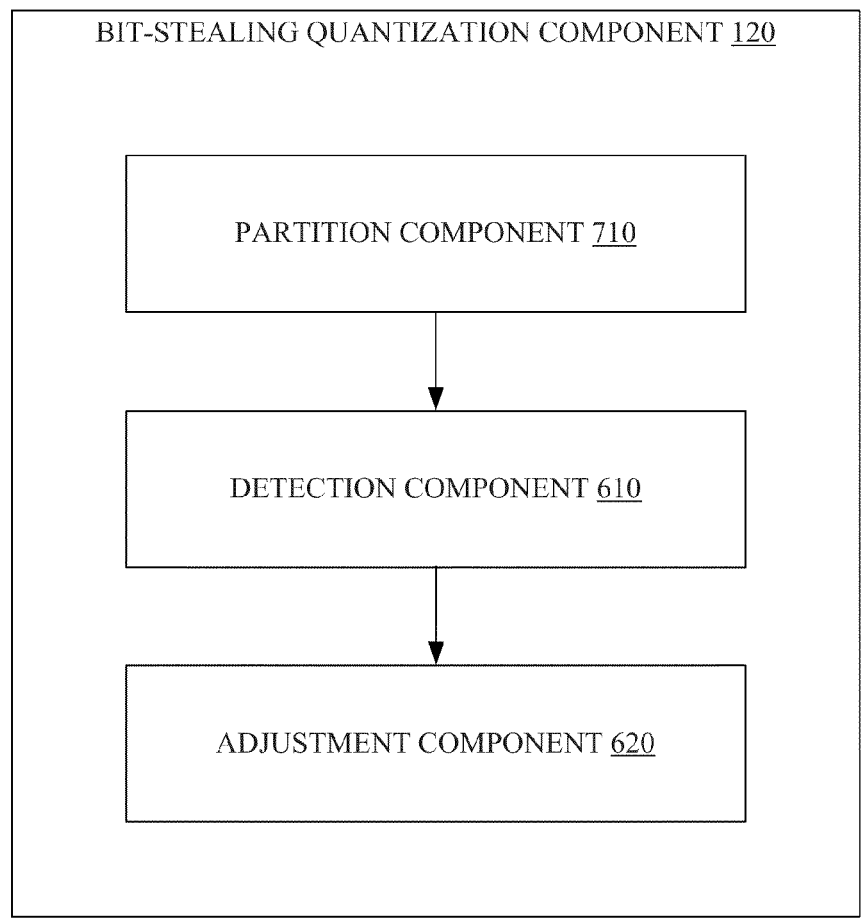

FIG. 7 illustrates bit-stealing quantization component 120 including a partition component 710, in accordance with an embodiment. Partition component 710 can be configured to partition the video data into at least one of different regions or different sub-sequences. Further, detection component 610 can further be configured to detect the one or more variances based on the at least one of the different regions or the different sub-sequences.

Figure 8:
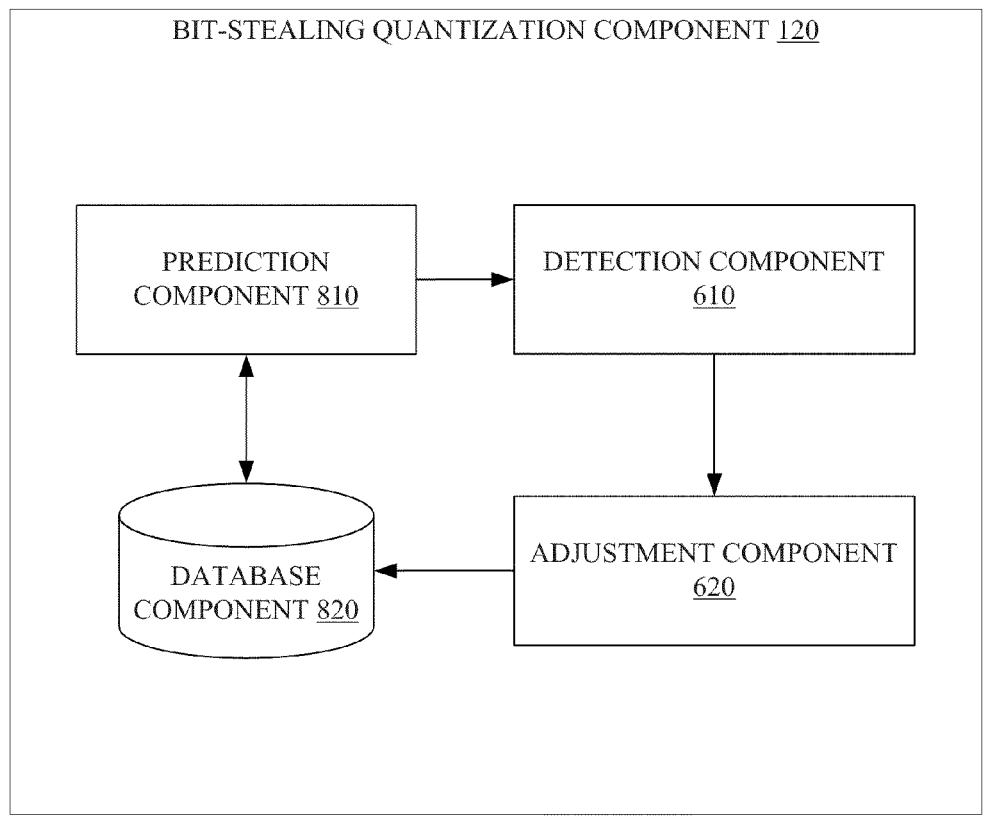

FIG. 8 illustrates bit-stealing quantization component 120 including a prediction component 810 and a database component 820, in accordance with an embodiment. Database component 820 can be configured to store information, e.g., including transform coefficient(s) and/or quantized coefficient value(s), etc. of a block, e.g., associated with video data 105, etc., in a data store (not shown), e.g., a storage medium. Further, prediction component 810 can be configured to predict a block to be encoded, e.g., associated with quantized coefficient value(s), based on information of a previously encoded block, e.g., associated with information generated via bit-stealing quantization component 120, detection component 610, adjustment component 620, etc. and stored in the data store, e.g., via database component 820.

FIGS. 9-16 illustrate methodologies in accordance with the disclosed subject matter. For simplicity of explanation, the methodologies are depicted and described as a series of acts. It is to be understood and appreciated that the subject innovation is not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 9:
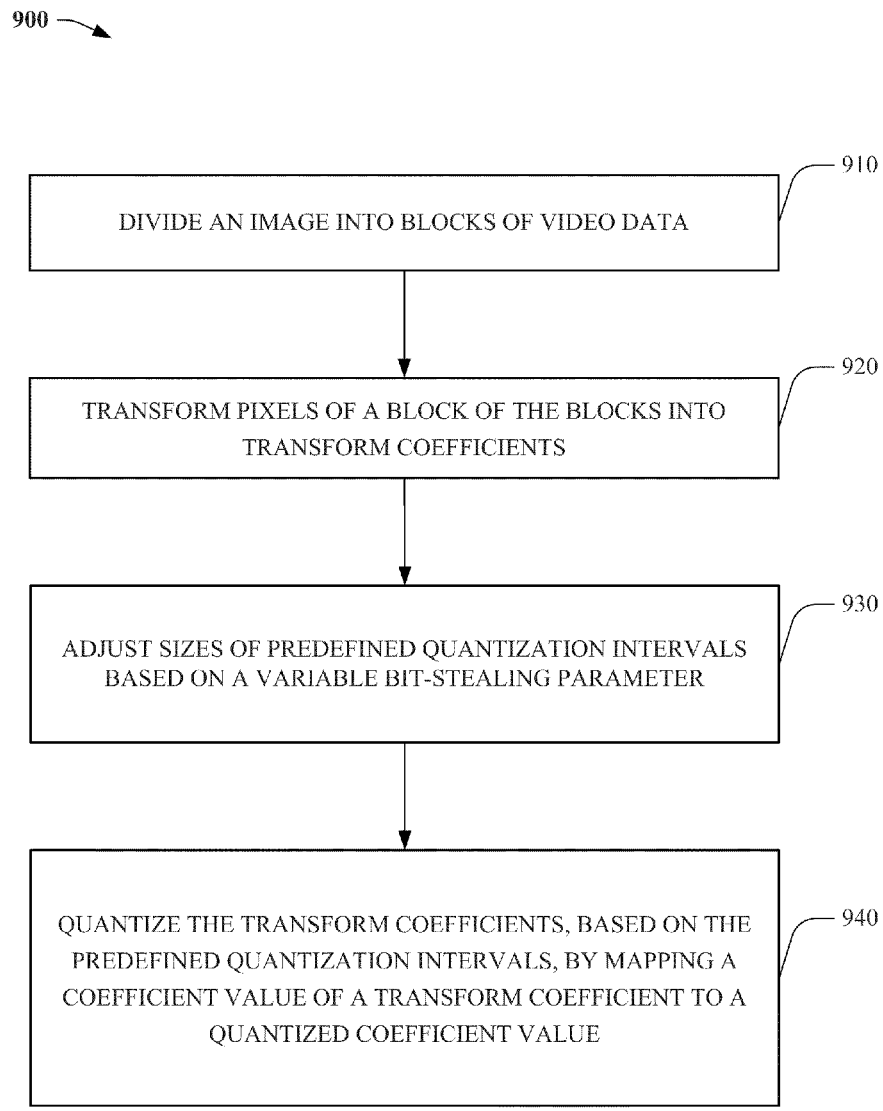
FIGS. 9-16 illustrate various processes associated adaptively zeroing out transform coefficients utilizing a bit-stealing parameter, in accordance with an embodiment.

Referring now to FIG. 9, a process 900 associated with an encoder, e.g., 110, etc. is illustrated, in accordance with an embodiment. At 910, an image, e.g., video data 105, etc. can be divided into blocks, e.g., representing 8×8 pixel areas (or macroblocks) of the image. At 920, pixels of a block of the blocks can be transformed into transform coefficients. Sizes of predefined quantization intervals can be adjusted, modified, etc. at 930, based on a variable bit-stealing parameter, e.g., d. (See, e.g., intervals associated with I=−1, I=0, and I=1 illustrated by FIG. 2). At 940, the transform coefficients can be quantized, based on the predefined quantization intervals, by mapping coefficient values of the transform coefficients to quantized coefficient values.

Figure 10:
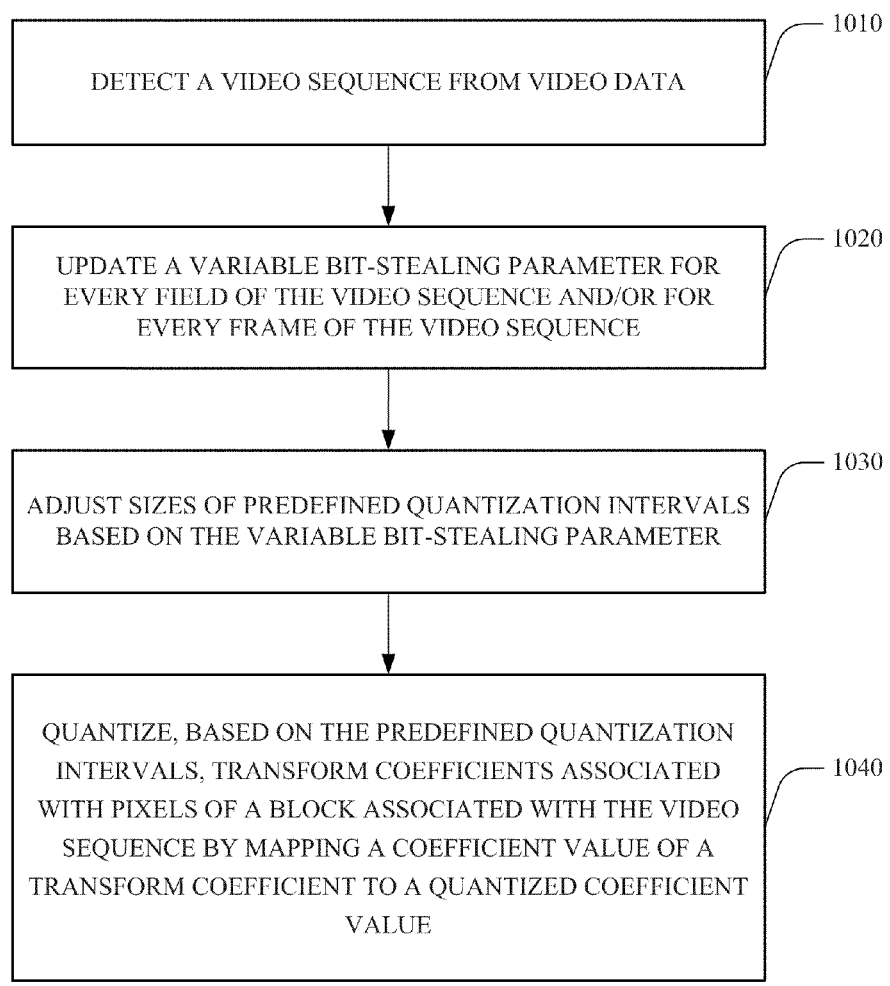

FIG. 10 illustrates another process (1000) associated with an encoder, e.g., 110, etc., in accordance with an embodiment. At 1010, a video sequence can be detected from video data, e.g., video data 105, etc. At 1020, a variable bit-stealing parameter, e.g., d, can be updated every field and/or frame of a video sequence. Sizes of predefined quantization intervals can be adjusted, at 1030, based on the variable bit-stealing parameter. At 1040, transform coefficients associated with pixels of a block of the video sequence can be quantized, based on the predefined quantization intervals, by mapping coefficient values of the transform coefficients to quantized coefficient values.

Figure 11:
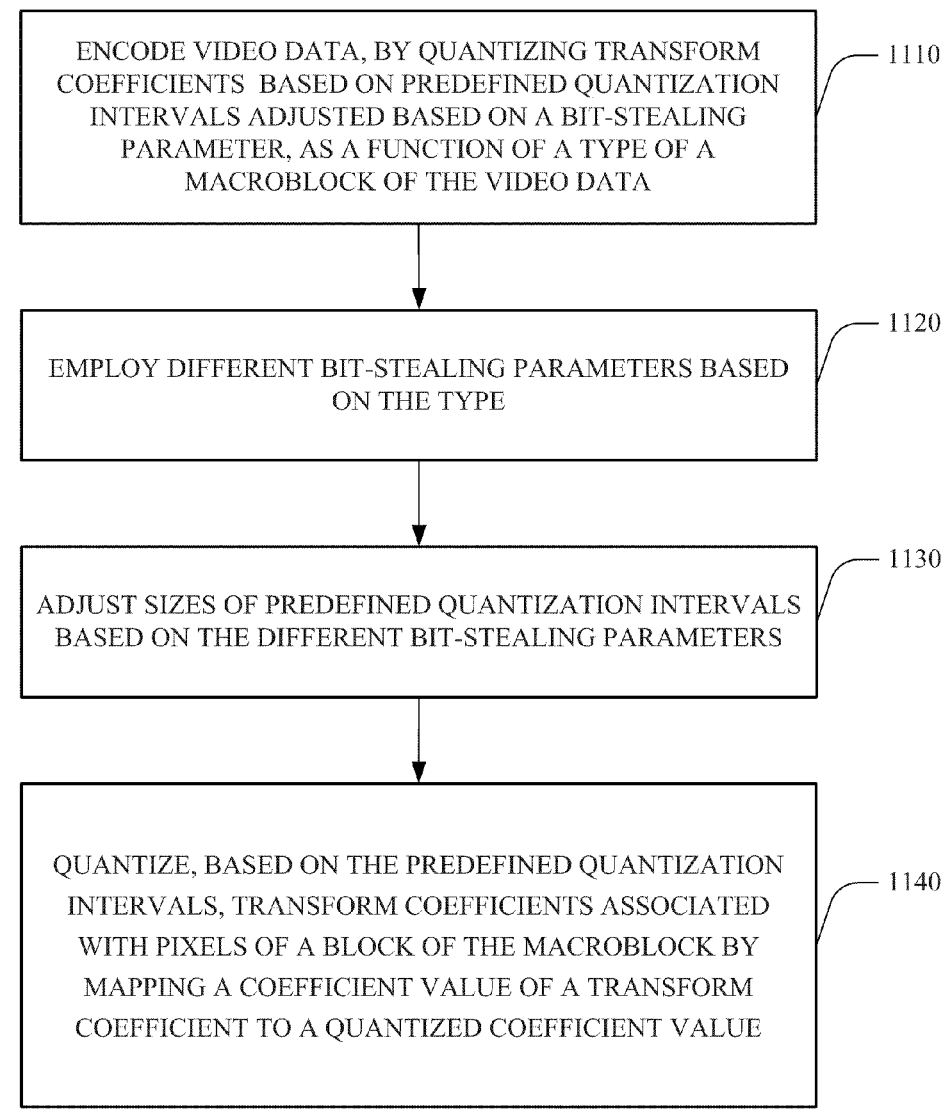

FIG. 11 illustrates a process (1100) associated with employing different bit-stealing parameters based on a type of a macroblock, in accordance with an embodiment. At 1110, video data can be encoded—by quantizing transform coefficients, e.g., via encoder 110, etc. based on predefined quantization intervals adjusted based on a bit-stealing parameter—as a function of a type, e.g., I type, P type, B type, etc. of a macroblock of the video data. Different bit-stealing parameters, e.g., d, can be employed, selected, used, etc. at 1120 based on the type. At 1130, sizes of predefined quantization intervals can be adjusted based on the different bit-stealing parameters. At 1140, transform coefficients associated with pixels of a block of the macroblock can be quantized, based on the predefined quantization intervals, by mapping coefficient values of the transform coefficients to quantized coefficient values.

Figure 12:
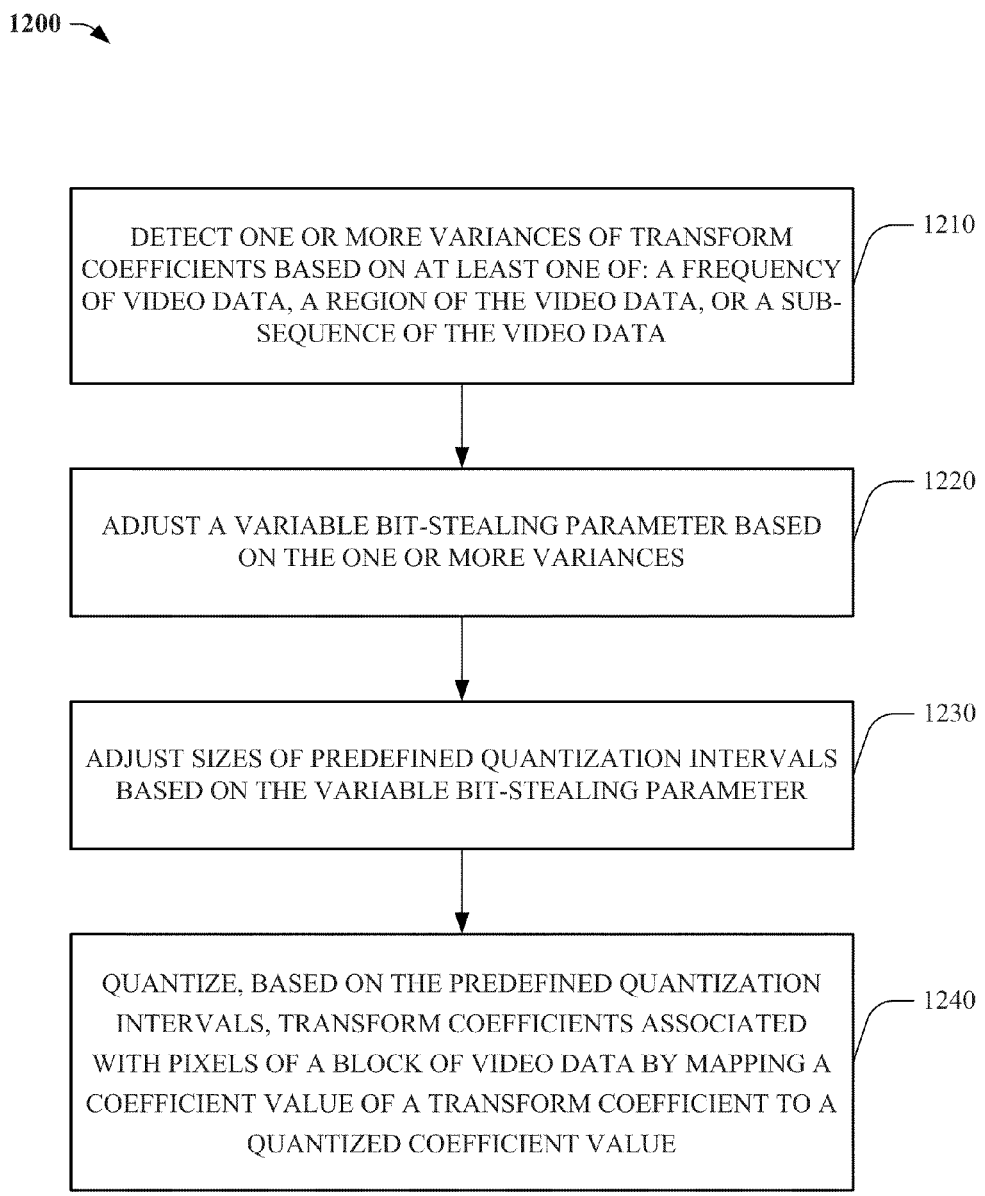

Referring now to FIG. 12, a process (1200) for adjusting a variable bit-stealing parameter based on detected variances of transform coefficients is illustrated, in accordance with an embodiment. At 1210, one or more variances (or changes) of transform coefficients associated with different frequencies, different regions, and/or different sub-sequences of video data can be detected. A variable bit-stealing parameter can be adjusted (or modified) at 1220 based on the one or more variances. At 1230, sizes of predefined quantization intervals can be adjusted, modified, etc. based on the variable bit-stealing parameter. At 1240, transform coefficients associated with pixels of a block of the video data can be quantized, based on the predefined quantization intervals, by mapping coefficient values of the transform coefficients to quantized coefficient values.

Figure 13:
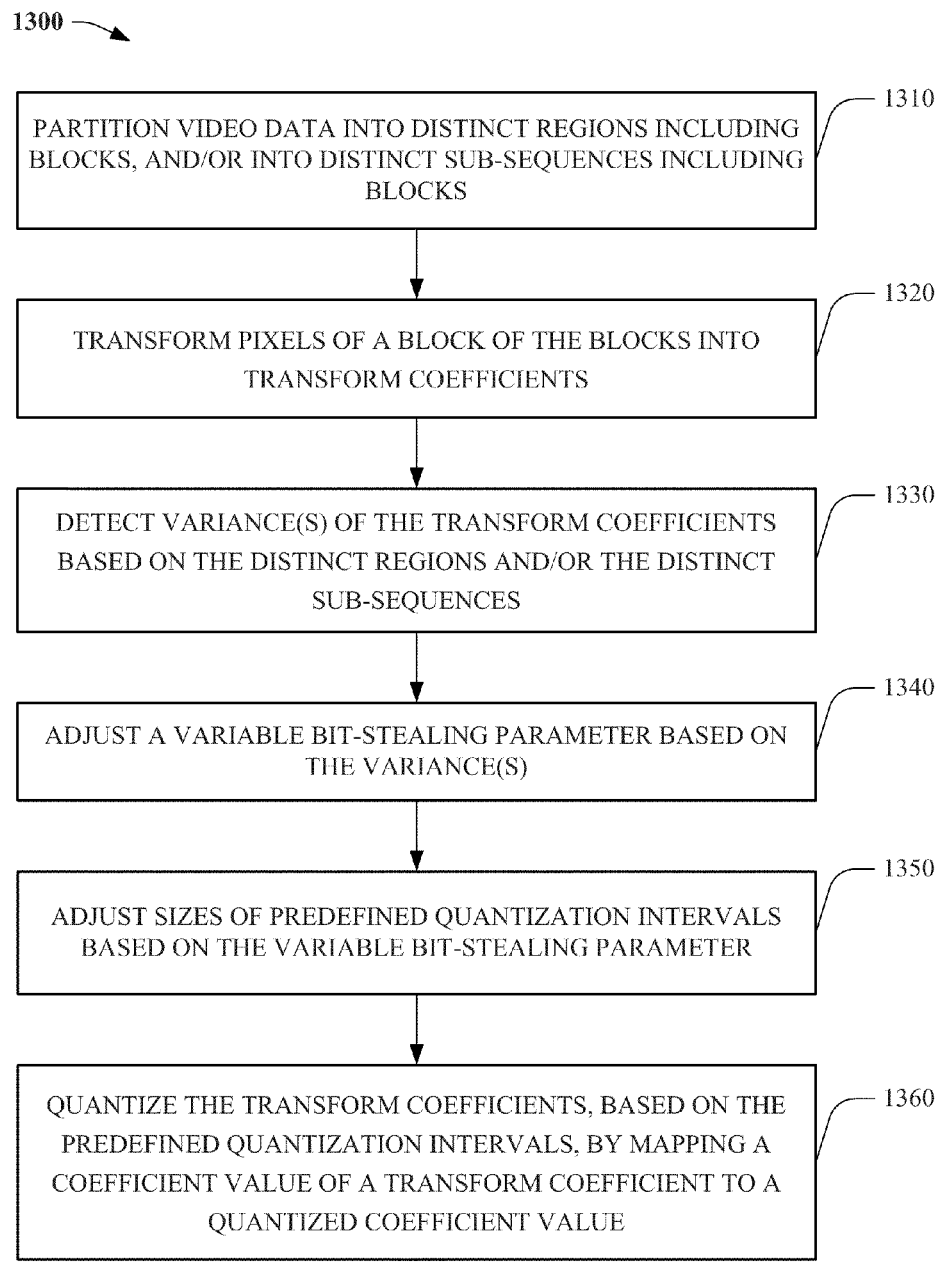

FIG. 13 illustrates a process (1300) associated with partitioning video data into distinct regions and/or sub-sequences, in accordance with an embodiment. At 1310, video data can be partitioned into different (or distinct) regions including blocks, and or into different sub-sequences including blocks. Pixels of a block of the blocks can be transformed, at 1320, into transform coefficients. At 1330, variance(s) of the transform coefficients can be detected based on the different regions and/or the different sub-sequences. A variable bit-stealing parameter, e.g., d, can be adjusted at 1340 based on the detected variance(s). At 1350, sizes of predefined quantization intervals can be adjusted, modified, changed, etc. based on the variable bit-stealing parameter. At 1360, the transform coefficients can be quantized, based on the predefined quantization intervals, by mapping coefficient values of the transform coefficients to quantized coefficient values.

Figure 14:
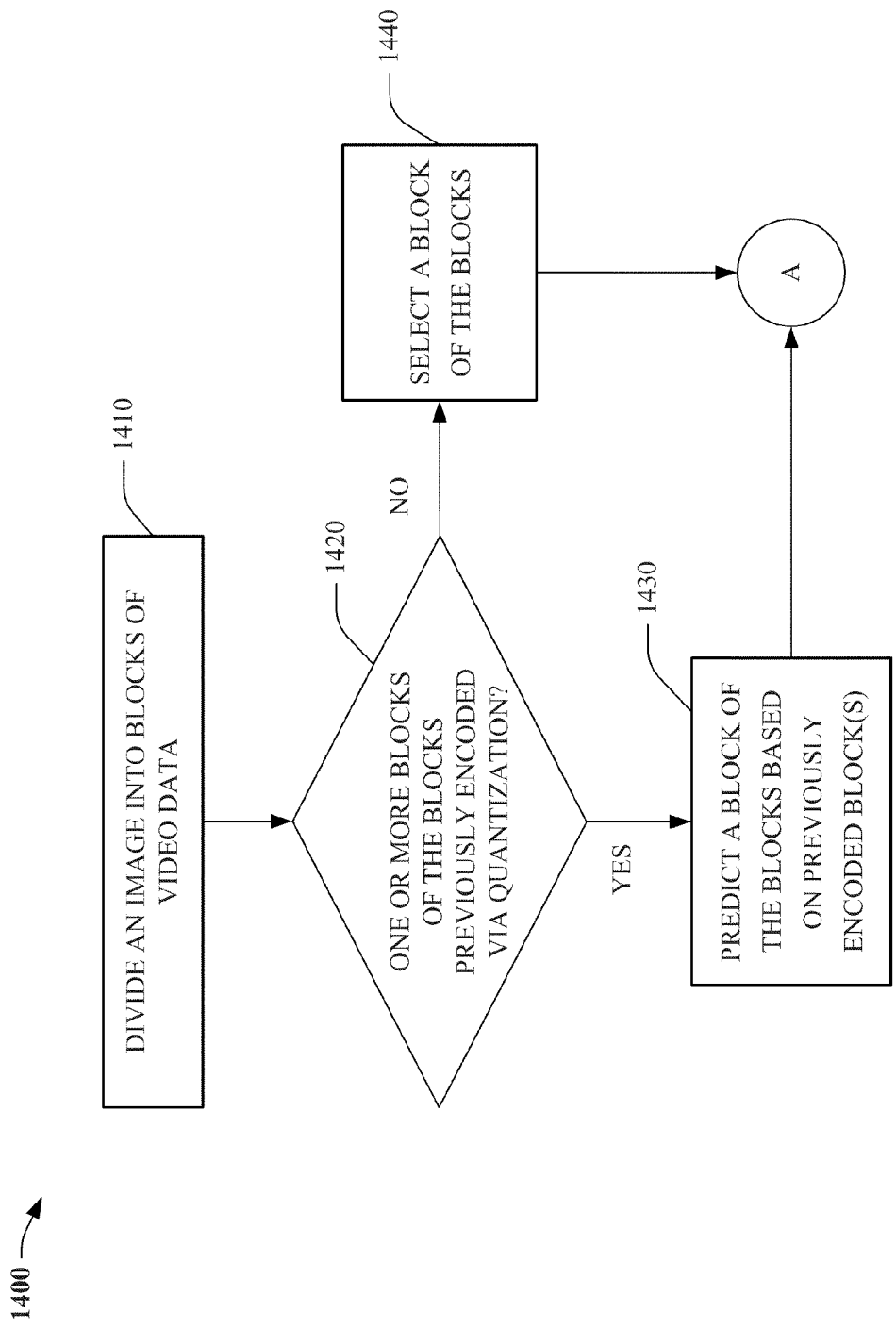
Figure 15:
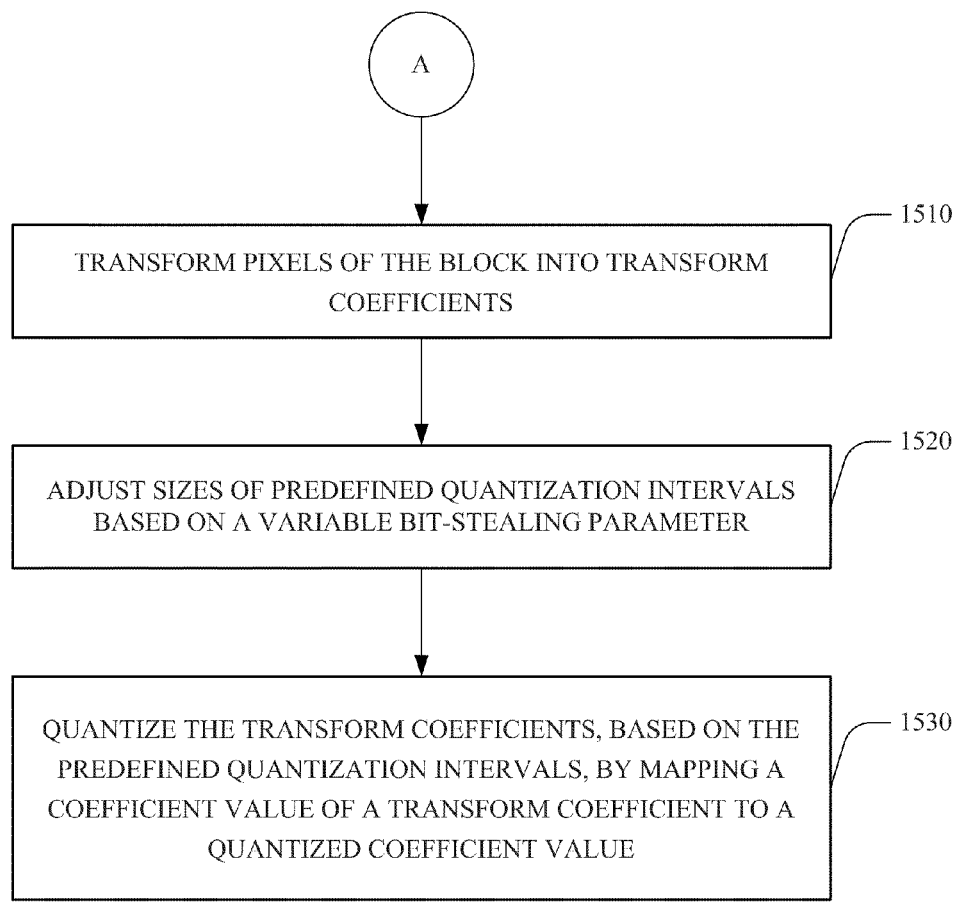

FIGS. 14-15 illustrate processes (1400 and 1500) for adaptively zeroing out transform coefficients, e.g., via encoder 110, utilizing a bit-stealing parameter (d), in accordance with an embodiment. At 1410, an image, or image information, can be divided into blocks of video data. Process 1400, e.g., via encoder 110 or variants thereof, can determine, at 1420, whether one or more blocks of the video data were previously encoded, e.g., via encoder 110, etc., for example, by referencing information in a data store associated with database component 820. If process 1400 determines that one or more blocks were previously encoded, then process 1400, e.g., via prediction component 810, can predict and/or select a block based on previously encoded blocks; otherwise, process 1400 can select a block at 1440.

Flow continues to 1510, at which process 1500 can transform pixels of the block into transform coefficients. At 1520, process 1500 can adjust sizes of predefined quantization intervals, e.g., via encoder 110, based on a variable bit-stealing parameter. At 1530, the transform coefficients can be quantized, based on the predefined quantization intervals, by mapping coefficient values of the transform coefficients to quantized coefficient values.

Figure 16:
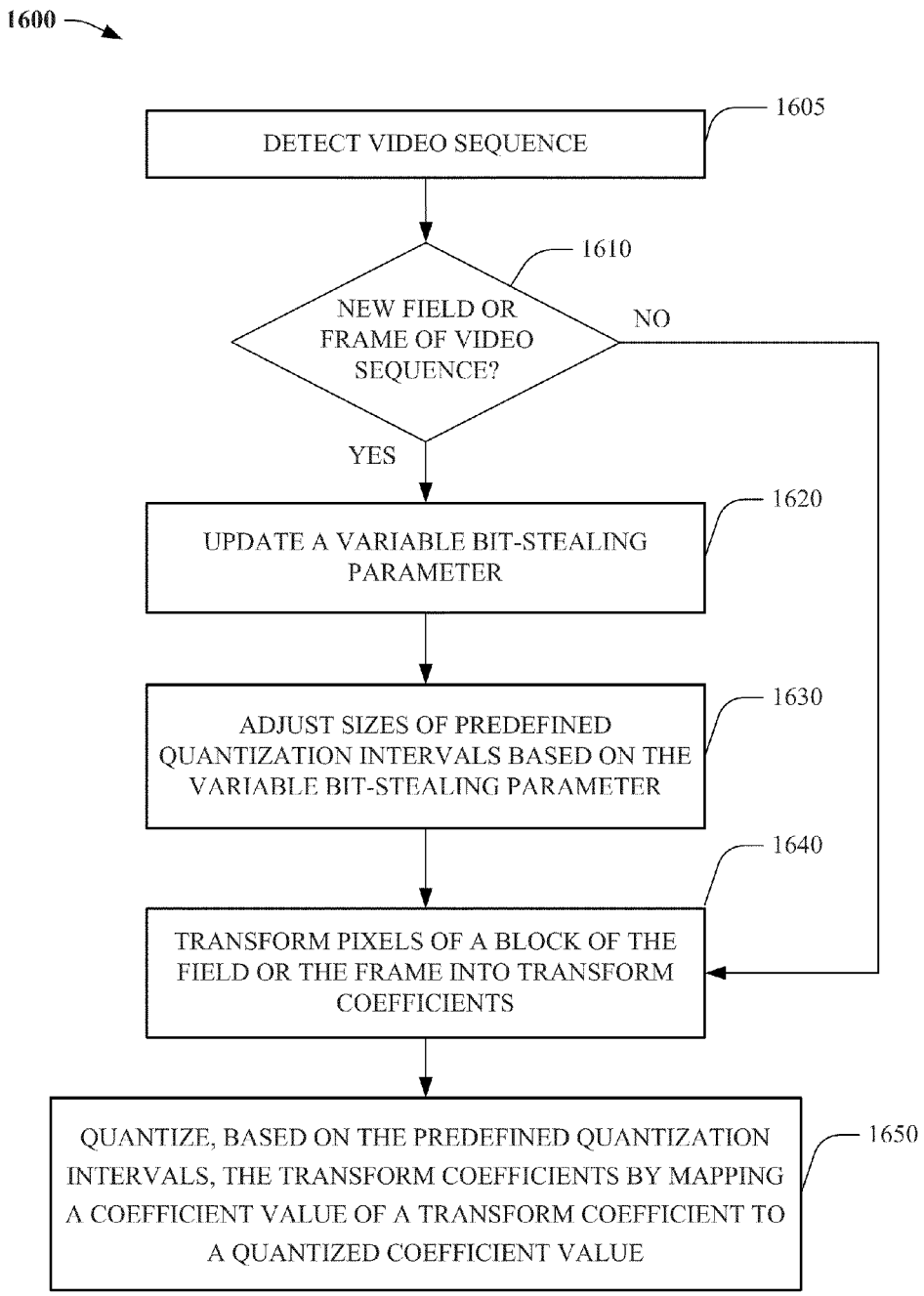

Referring now to FIG. 16, another process (1600) for adaptively zeroing out transform coefficients, e.g., via encoder 110, utilizing a bit-stealing parameter (d) is illustrated, in accordance with an embodiment. At 1605, a video sequence can be detected, analyzed, obtained, received, etc. Process 1600 can determine, at 1610, whether a new field and/or frame of the video sequence were/was detected. If process 1600 determines the new field and/or frame were/was detected, then flow continues to 1620, at which a variable bit-stealing parameter can be updated; otherwise, flow continues to 1640, at which process 1600 can transform pixels of a block of the field and/or the frame into transform coefficients.

Flow continues from 1620 to 1630, at which process 1600 can adjust sizes of predefined quantization intervals based on the variable bit-stealing parameter. At 1650, the transform coefficients can be quantized, based on the predefined quantization intervals, by mapping coefficient values of the transform coefficients to quantized coefficient values.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "database," "storage medium," and substantially any other information storage component relevant to operation and functionality of a component and/or process, refer to "memory components," or entities embodied in a "memory," or components comprising the memory. It will be appreciated that the memory components described herein can be either volatile memory or nonvolatile memory, or can include both volatile and nonvolatile memory.

By way of illustration, and not limitation, nonvolatile memory, for example, can be included in storage systems described above (e.g., associated with database component 820), non-volatile memory 1722 (see below), disk storage 1724 (see below), and memory storage 1746 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 17:
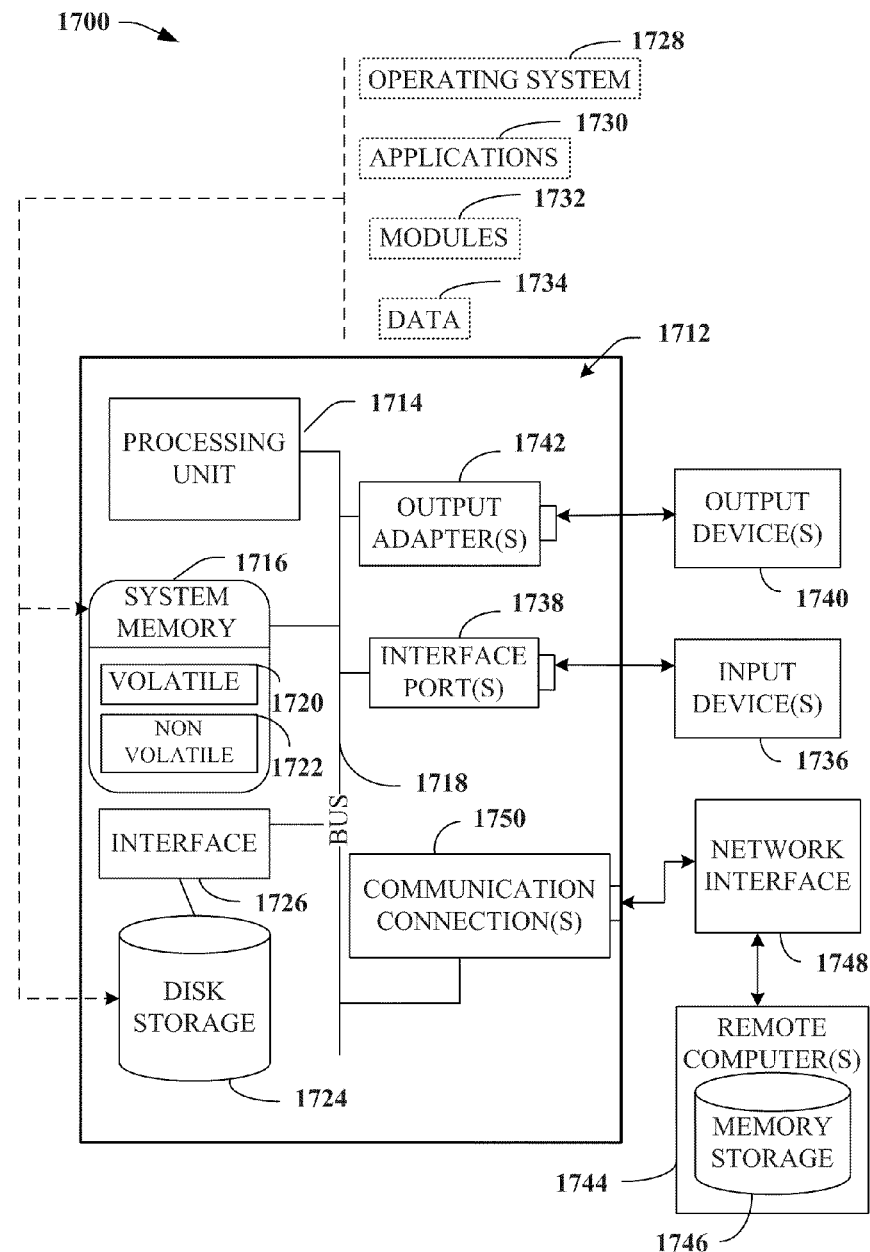
FIG. 17 illustrates a block diagram of a computing system operable to execute the disclosed systems and methods, in accordance with an embodiment.

In order to provide a context for the various aspects of the disclosed subject matter, FIG. 17, and the following discussion, are intended to provide a brief, general description of a suitable environment in which the various aspects of the disclosed subject matter can be implemented, e.g., various processes associated with FIGS. 1-16. While the subject matter has been described above in the general context of computer-executable instructions of a computer program that runs on a computer and/or computers, those skilled in the art will recognize that the subject innovation also can be implemented in combination with other program modules. Generally, program modules include routines, programs, components, data structures, etc. that perform particular tasks and/or implement particular abstract data types.

Moreover, those skilled in the art will appreciate that the inventive systems can be practiced with other computer system configurations, including single-processor or multiprocessor computer systems, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

With reference to FIG. 17, a block diagram of a computing system 1700 operable to execute the disclosed systems and methods is illustrated, in accordance with an embodiment. Computer 1712 includes a processing unit 1714, a system memory 1716, and a system bus 1718. System bus 1718 couples system components including, but not limited to, system memory 1716 to processing unit 1714. Processing unit 1714 can be any of various available processors. Dual microprocessors and other multiprocessor architectures also can be employed as processing unit 1714.

System bus 1718 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1194), and Small Computer Systems Interface (SCSI).

System memory 1716 includes volatile memory 1720 and nonvolatile memory 1722. A basic input/output system (BIOS), containing routines to transfer information between elements within computer 1712, such as during start-up, can be stored in nonvolatile memory 1722. By way of illustration, and not limitation, nonvolatile memory 1722 can include ROM, PROM, EPROM, EEPROM, or flash memory. Volatile memory 1720 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1712 can also include removable/non-removable, volatile/non-volatile computer storage media, networked attached storage (NAS), e.g., SAN storage, etc. FIG. 17 illustrates, for example, disk storage 1724. Disk storage 1724 includes, but is not limited to, devices like a magnetic disk drive, floppy disk drive, tape drive, Jaz drive, Zip drive, LS-100 drive, flash memory card, or memory stick. In addition, disk storage 1724 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1724 to system bus 1718, a removable or non-removable interface is typically used, such as interface 1726.

It is to be appreciated that FIG. 17 describes software that acts as an intermediary between users and computer resources described in suitable operating environment 1700. Such software includes an operating system 1728. Operating system 1728, which can be stored on disk storage 1724, acts to control and allocate resources of computer 1712. System applications 1730 take advantage of the management of resources by operating system 1728 through program modules 1732 and program data 1734 stored either in system memory 1716 or on disk storage 1724. It is to be appreciated that the disclosed subject matter can be implemented with various operating systems or combinations of operating systems.

A user can enter commands or information into computer 1712 through input device(s) 1736. Input devices 1736 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to processing unit 1714 through system bus 1718 via interface port(s) 1738. Interface port(s) 1738 include, for example, a serial port, a parallel port, a game port, and a universal serial bus (USB). Output device(s) 1740 use some of the same type of ports as input device(s) 1736.

Thus, for example, a USB port can be used to provide input to computer 1712 and to output information from computer 1712 to an output device 1740. Output adapter 1742 is provided to illustrate that there are some output devices 1740 like monitors, speakers, and printers, among other output devices 1740, which use special adapters. Output adapters 1742 include, by way of illustration and not limitation, video and sound cards that provide means of connection between output device 1740 and system bus 1718. It should be noted that other devices and/or systems of devices provide both input and output capabilities such as remote computer(s) 1744.

Computer 1712 can operate in a networked environment using logical connections to one or more remote computers, such as remote computer(s) 1744. Remote computer(s) 1744 can be a personal computer, a server, a router, a network PC, a workstation, a microprocessor based appliance, a peer device, or other common network node and the like, and typically includes many or all of the elements described relative to computer 1712.

For purposes of brevity, only a memory storage device 1746 is illustrated with remote computer(s) 1744. Remote computer(s) 1744 is logically connected to computer 1712 through a network interface 1748 and then physically connected via communication connection 1750. Network interface 1748 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1750 refer(s) to hardware/software employed to connect network interface 1748 to bus 1718. While communication connection 1750 is shown for illustrative clarity inside computer 1712, it can also be external to computer 1712. The hardware/software for connection to network interface 1748 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    dividing, by a system comprising a processor, an image into blocks of video data;
    transforming pixels of a block of the blocks into transform coefficients;
    setting a value of a variable bit-stealing parameter;
    adjusting a size of a quantization interval of quantization intervals and a dead zone based on the variable bit-stealing parameter, wherein sizes of remaining quantization intervals of the quantization intervals are unchanged, and wherein an absolute value of the variable bit-stealing parameter is less than or equal to a determined step size of the quantization intervals minus half of a step size of a selected quantization interval of the quantization intervals associated with the dead zone;
    in response to encoded video data being determined to satisfy a defined condition with respect to a relationship between an amount of improvement of a video quality of the video data and a change in size of a bitstream associated with the video data, adding at least one bit to the bitstream based on the variable bit-stealing parameter; and
    quantizing the transform coefficients, based on the quantization intervals, by mapping a coefficient value of a transform coefficient of the transform coefficients to a quantized coefficient value, wherein the encoded video data includes the quantized coefficient value.

2. The method of claim 1, wherein the adjusting the size of the quantization interval comprises adjusting the size of the quantization interval based on a rounding offset not included in the encoded video data.

3. The method claim 1, further comprising:
    updating the variable bit-stealing parameter for at least one of every field of a video sequence of the video data or every frame of the video sequence.

4. The method of claim 1, further comprising:
    updating the variable bit-stealing parameter:
        once per video sequence of video sequences related to encoded video data; or
        once per predefined sub-sequence of the video sequences.

5. The method of claim 1, further comprising:
    encoding the video data, via the quantizing, based on a type of a macroblock including at least one of an intra type of the macroblock, a predicted type of the macroblock, or a bi-directionally predicted type of the macroblock; and
    employing different bit-stealing parameters based on the type.

6. The method of claim 1, further comprising:
    detecting one or more variances of the transform coefficients based on at least one of a frequency, a region of the video data, or a sub-sequence of the video data; and
    adjusting the variable bit-stealing parameter based on the one or more variances.

7. The method of claim 1, further comprising:
    partitioning the video data into different regions;
    detecting one or more variances of the transform coefficients based on the different regions; and
    adjusting the variable bit-stealing parameter based on the one or more variances.

8. The method of claim 1, further comprising:
    partitioning the video data into different sub-sequences;
    detecting one or more variances of the transform coefficients based on the different sub-sequences; and
    adjusting the variable bit-stealing parameter based on the one or more variances.

9. The method of claim 1, further comprising:
    predicting the block based on an encoded block of the plurality of blocks previously encoded via the quantizing.

10. An encoder, comprising:
    a processor configured to execute components, comprising:
    a partitioning component configured to separate an image into blocks of video data;
    a frequency transform component configured to transform pixels of a block of the blocks into transform coefficients; and
    a bit-stealing quantization component configured to:
        predefine quantization intervals;
        modify a size of a dead zone and a first quantization interval of the quantization intervals based on a variable bit-stealing parameter, wherein sizes of remaining quantization intervals of the quantization intervals have not been changed;
        modify a quantization size of the first quantization interval based on an absolute value of the variable bit-stealing parameter that is less than or equal to a step size of the quantization intervals minus half of another step size of a second quantization interval of the quantization intervals associated with the dead zone;
        in response to a determination that quantized video data satisfies a defined condition with respect to a relationship between an amount of improvement of video quality of the video data and a change in size of a bitstream associated with the video data, increase an amount of bits of the bitstream based on the variable bit-stealing parameter; and quantize a transform coefficient of the transform coefficients, based on the first quantization interval, to a quantized coefficient value of quantized coefficient values.

11. The encoder of claim 10, wherein the bit-stealing quantization component is further configured to modify the size of the first quantization interval based on a rounding offset not included in encoded data associated with the quantized coefficient values.

12. The encoder of claim 10, wherein the bit-stealing quantization component is further configured to update the variable bit-stealing parameter every field of a video sequence of the video data associated with the pixels of the block or every frame of the video sequence.

13. The encoder of claim 10, wherein the bit-stealing quantization component is further configured to:

update the variable bit-stealing parameter once per video sequence of video sequences of the video data associated with the pixels of the block; or update the variable bit-stealing parameter every pre-defined sub-sequence of the video sequence.

14. The encoder of claim 10, wherein the bit-stealing quantization component is further configured to:

quantize the transform coefficient based on a type of a macroblock including at least one of an intra type of the macroblock, a predicted type of the macroblock, or a bi-directionally predicted type of the macroblock; and modify the variable bit-stealing parameter based on the type.

15. The encoder of claim 10, wherein the bit-stealing quantization component comprises:

a detection component configured to detect one or more variances of the transform coefficients based on at least one of a frequency, a region of the video data, or a sub-sequence of the video data; and an adjustment component configured to modify the variable bit-stealing parameter based on the one or more variances.

16. The encoder of claim 15, wherein the bit-stealing quantization component further comprises:

a partition component configured to partition the video data into at least one of different regions or different sub-sequences, wherein the detection component is further configured to detect the one or more variances based on the at least one of the different regions or the different sub-sequences.

17. A non-transitory computer readable medium comprising executable instructions that, in response to execution, cause a system comprising a processor to perform operations, comprising:

transforming pixels of a block of video data into transform coefficients;

setting a variable bit-stealing parameter;

adjusting a size of a quantization interval of the quantization intervals and a dead zone based on the variable bit-stealing parameter, wherein sizes of remaining quantization intervals of the quantization intervals are unchanged, and wherein an absolute value of the variable bit-stealing parameter is less than or equal to a maximum step size of the quantization intervals minus half of a step size of a selected quantization interval of the quantization intervals that is associated with the dead zone;

determining that quantized video data satisfies a defined condition with respect to a relationship between an amount of improvement of video quality of the video data and a change in size of a bitstream associated with the video data;

adding one or more bits to the bitstream based on the variable bit-stealing parameter; and quantizing the transform coefficients, based on the quantization intervals, into quantized coefficient values.

18. The non-transitory computer readable medium of claim 17, wherein the adjusting the size of the quantization interval comprises adjusting the size of the quantization interval based on a rounding offset not included in the quantized video data.

19. The non-transitory computer readable medium of claim 17, wherein the operations further comprise:

updating the variable bit-stealing parameter for at least one of every field of a video sequence of the video data.

20. The non-transitory computer readable medium of claim 17, wherein the operations further comprise:

partitioning the video data into different regions;

detecting one or more variances of the transform coefficients based on the different regions; and adjusting the variable bit-stealing parameter based on the one or more variances.

* * * * *